United States Patent [19]

Lycett

[11] Patent Number: 5,267,819
[45] Date of Patent: Dec. 7, 1993

[54] TWISTLOCKS

[75] Inventor: Peter Lycett, West Midlands, United Kingdom

[73] Assignee: Multi-Stroke Handbrake Controls Limited of Green Lane, Tewkesbury, United Kingdom

[21] Appl. No.: 944,484

[22] Filed: Sep. 14, 1992

[51] Int. Cl.⁵ .............................................. B60P 1/64
[52] U.S. Cl. .................................... 104/82; 24/287
[58] Field of Search ................... 410/82, 83; 24/287; 294/81.53; 220/23.4, 1.5

[56] References Cited

U.S. PATENT DOCUMENTS

| | | | |
|---|---|---|---|
| 3,737,135 | 6/1973 | Bertolini | 410/82 |
| 4,352,613 | 10/1982 | Bertolini | 410/82 |
| 4,697,967 | 10/1987 | Schulz et al. | 410/82 |
| 4,828,308 | 5/1989 | Riedl | 294/81.53 |
| 5,160,224 | 11/1992 | Schwiebert | 24/287 |

*Primary Examiner*—Mark T. Le
*Attorney, Agent, or Firm*—Ratner & Prestia

[57] ABSTRACT

A twistlock for locating and locking a freight container on a container-supporting deck of a vehicle. The twistlock is designed to be welded-in to its operating location on the vehicle deck. The twistlock has a register and a mounting boss which are separate components, such that the mounting boss can be welded-in to a pre-cut hole in the deck as an initially separate component, thus obviating welding-heat-induced distortion of the twistlock. The mounting boss is axially self-aligning in the deck, and the remaining components of the twist lock drop into place.

15 Claims, 2 Drawing Sheets

TWISTLOCKS

BACKGROUND OF THE INVENTION

(1) Field of the Invention

This invention relates to devices known in the art as "twistlocks", which are devices for use to locate and lock I.S.O. freight transport containers (and equivalent containers built to other standards) in position on road vehicle trailers, railway wagons, and the like.

A twistlock normally comprises two essential components: (1) a locating block or "register"; and (2) a T-headed bolt or "anvil bolt". The register provides lateral location and restraint to the respective corner fitting of the I.S.O. container. The centre of the register normally has a hole which accommodates the stem of the anvil bolt, with the head of the anvil bolt being located just above the top of the register. The register is very approximately rectangular in plan. By turning the anvil bolt vertically around its stem (protruding up through the middle of the register), the T-shaped head of the anvil bolt can be either aligned with the register, or turned cross-ways thereto. When the register and the bolt head are aligned, an I.S.O. container can be lowered onto and fitted over the bolt and register, or lifted away from them. When the bolt head is turned cross-ways to the register with an I.S.O. container in place, the container is latched in place (assuming the register and the anvil bolt to be suitably anchored). Such twistlocks are well known, both for I.S.O. containers, and for containers complying with other standards.

Some trailer manufacturers prefer that the twistlocks which they install on trailers manufactured by them are purchased by them as ready-made units which are then installed by welding the unit directly into place, rather than by bolt-mounting a unit through a mounting bracket thereof. This is particularly the case where the twistlocks are not intended to be retractable into the carrying deck of the relevant vehicle, nor otherwise lowered to positions in which the twistlocks do not protrude from the deck.

(2) Description of the Prior Art

A welded-in non-retractable twistlock is described by Schulz et al in U.S. Pat. No. 4,697,967, the disclosure of which is incorporated herein by reference.

The various form of twistlock disclosed by Schulz et al in U.S. Pat. No. 4,697,967 all have a register which is integral with a mounting boss by which the twistlock is welded into its operational location. This integral component provides the through-bore in which the anvil bolt is rotatable, and further provides the static part of latching means by which the anvil bolt is rotationally latched in its two rotational positions, one such rotational position being rotational alignment of the bolt head with the register for placement or removal of the container, and the other rotational position being rotational misalignment (typically by about 70 degrees) of the bolt head with the register for latching of the container by the twistlock.

Thus this integral component of the Schulz et al twistlocks requires particularly careful alignment during welding thereof into place, and further requires precautions to be taken against undesirable distortions being induced by the welding procedure, such as might cause failure of the anvil bolt to pivot properly therein and/or failure of the rotational latching mechanism of the twistlock.

It is therefore an object of the invention to provide a welded-in non-retractable twistlock which is free of such disadvantages.

BRIEF SUMMARY OF THE INVENTION

According to a first aspect of the present invention there is provided a twistlock which can be welded-in to an operational position thereof in a container-supporting deck of a vehicle, said twistlock comprising:

a register having a periphery which is approximately rectangular in plan and which is bounded in plan by an opposed pair of relatively longer sides joined by an opposed pair of relatively shorter sides, said register having a substantially central through-bore having an axis which is substantially normal to the plan of said register, an anvil bolt having a T-shaped head and a substantially cylindrical stem depending therefrom about a longitudinal axis of said bolt, said T-shaped head of said anvil bolt having a periphery whose outline in plan substantially matches said periphery of said register, said through-bore of said register and said substantially cylindrical stem of said anvil bolt being dimensionally related such as to allow said anvil bolt to rotate in said through-bore of said register, about said longitudinal axis of said bolt, said twistlock further comprising a mounting boss having a deck-underside-abutting peripheral flange thereon, said peripheral flange having a deck-underside-abutting axial face for abutting the underside of a container-supporting deck of a vehicle upon which said twistlock is installed in use thereof, said mounting boss having a substantially circular welding bevel thereon substantially contiguous with said-deck-underside-abutting axial face of said peripheral flange of said mounting boss, said substantially circular welding bevel being located substantially entirely within the periphery of said peripheral flange of said mounting boss, said mounting boss having an aperture therethrough, said aperture in said mounting boss being substantially coaxial with said substantially circular welding bevel, said aperture in said mounting boss having transverse dimensions at least marginally greater than the transverse dimensions of said substantially cylindrical stem of said anvil bolt to permit said stem to rotate within said aperture substantially without mutual interference therebetween, and said twistlock additionally comprising retention means for retaining said register and said anvil bolt in operational positions in said twistlock upon assembly thereof.

Said retention means preferably comprises rotational constraint means to rotationally constrain said register substantially in a predetermined rotational position on a topside of a container-supporting deck of a vehicle upon assembly of said twistlock thereon, and axial restraint means mountable adjacent a lower end of said stem of said anvil bolt to axially restrain said anvil bolt in said twistlock while permitting rotational freedom of said anvil bolt at least in a range of rotational movement of said anvil bolt about said longitudinal axis thereof between a first rotational position of said anvil bolt in which said T-shaped head of said anvil bolt has said periphery thereof substantially aligned with said periphery of said register, and a second rotational position of said anvil bolt in which said T-shaped head of said anvil bolt has the periphery thereof substantially misaligned with said periphery of said register for performance of a container-latching function in use of said twistlock after assembly thereof on a container-supporting deck of a vehicle.

Said rotational constraint means of said retention means preferably comprises mutually cooperable key and slot means on portions of said register and of said mounting boss which are mutually adjacent in said twistlock when assembled on a container-supporting deck of a vehicle, said key and slot means mutually cooperating in a so-assembled twistlock to provide said rotational constraint of said register.

Said axial restraint means of said retention means preferably comprises a collar means securable on said stem of said anvil bolt at a position thereon immediately adjacent said mounting boss in said twistlock when assembled on a container-supporting deck of a vehicle, said collar means having transverse dimensions greater than said transverse dimensions of said aperture through said mounting boss to prevent passage of said collar means through said aperture in a so-assembled twistlock to provide said axial restraint of said anvil bolt.

Said twistlock preferably incorporates rotational detent means in the assembled configuration thereof, said rotational detent means being located between said register and said anvil bolt to be mutually effective thereon to rotationally detain said anvil bolt in each of said first and second rotational positions thereof when said anvil bolt is rotated to the respective one of said first and second positions.

Said twistlock preferably further comprises handle means by which said anvil bolt may be manually rotated at least between said first and second positions thereof, said handle means preferably being secured to or integral with either the lower end of said stem of said anvil bolt or with said collar means mounted thereon.

According to a second aspect of the present invention there is provided a twistlock welded-in to a substantially circular hole through a container-supporting deck of a vehicle, said deck having a topside and an underside, said twistlock comprising:

a mounting boss having a deck-underside-abutting peripheral flange thereon, said peripheral flange having a deck-underside-abutting axial face abutting portions of said underside of said container-supporting deck surrounding said substantially circular hole therethrough, said mounting boss having a substantially circular welding bevel thereon substantially contiguous with said deck-underside-abutting axial face of said peripheral flange of said mounting boss, said substantially circular welding bevel being located substantially entirely within the periphery of said peripheral flange of said mounting boss, said substantially circular welding bevel being located within and welded-in to said substantially circular hole through said container-supporting deck, said mounting boss having an aperture therethrough substantially coaxial with said substantially circular welding bevel, said twistlock further comprising a register having a periphery which is approximately rectangular in plan and which is bounded in plan by an opposed pair of relatively longer sides joined by an opposed pair of relatively shorter sides, said register being mounted on said welded-in mounting boss to have said approximately rectangular periphery thereof upstanding from said topside of said container-supporting deck, said twistlock additionally comprising retention means including rotational constraint means mutually effective between said mounting boss and said register to rotationally constrain said register substantially in a predetermined rotational position on said topside of said container-supporting deck, said twistlock further comprising an anvil bolt having a T-shaped head and a substantially cylindrical stem depending therefrom about a longitudinal axis of said bolt, said register having a substantially central through-bore having an axis which is substantially normal to said topside of said container-supporting deck, said anvil bolt being mounted on said register with said substantially cylindrical stem of said anvil bolt depending substantially coaxially through said through bore of said register and depending substantially coaxially through said aperture in said mounting boss for rotation of said anvil bolt about said longitudinal axis thereof with said longitudinal axis thereof aligned substantially normal to said topside of said container-supporting deck, said through-bore of said register and said substantially cylindrical stem of said anvil bolt being dimensionally related such as to allow such rotation of said anvil bolt about said longitudinal axis thereof, said aperture in said mounting boss having transverse dimension at least marginally greater that the transverse dimensions of said substantially cylindrical stem of said anvil bolt to permit said stem to rotate within said aperture substantially without mutual interference therebetween, said T-shaped head of said anvil bolt having a periphery whose outline in plan substantially matches said periphery of said register, said anvil bolt being rotatable at least in a range of rotational movements about said longitudinal axis thereof between a first rotational position of said anvil bolt in which said T-shaped head of said anvil bolt has said periphery thereof substantially aligned with said periphery of said register, and a second rotational position of said anvil bolt in which said T-shaped head of said anvil bolt has the periphery thereof substantially misaligned with said periphery of said register for performance of a container-latching function of said twistlock, said retention means of said twistlock additionally comprising axial restraint means mounted adjacent a lower end of said stem of said anvil bolt to axially restrain said anvil bolt in said twistlock while permitting rotational freedom of said anvil bolt in a range of rotational movement of said anvil bolt about said longitudinal axis thereof at least between said first and second rotational positions of said anvil bolt.

Said rotational constraint means of said retention means preferably comprises mutually cooperating key and slot means on mutually adjacent portions of said register and of said mounting boss, said mutually cooperating key and slot means cooperating in said twistlock to provide said rotational constraint of said register.

Said axial restraint means of said retention means preferably comprises a collar means secured on said stem of said anvil bolt at a position thereon immediately below the portion of said stem depending through said aperture in said mounting boss, said collar means having transverse dimensions greater than said transverse dimensions of said aperture to prevent passage of said collar means and hence of said stem through said mounting boss.

Said twistlock preferably further comprises rotational detent means located between said register and said anvil bolt to be mutually effective thereon to rotationally detain said anvil bolt in either one of said first and second rotational positions thereof.

Said twistlock preferably further comprises handle means by which said anvil bolt can be manually rotated at least between said first and second rotational positions thereof, said handle means preferably being secured to or integral with either the lower end of said stem of said anvil bolt, or with said collar means mounted thereon.

BRIEF DESCRIPTION OF THE DRAWINGS

Embodiments of the invention will now be described by way of example with reference to the accompanying drawings wherein.

DETAILED DESCRIPTION

Figure 1:
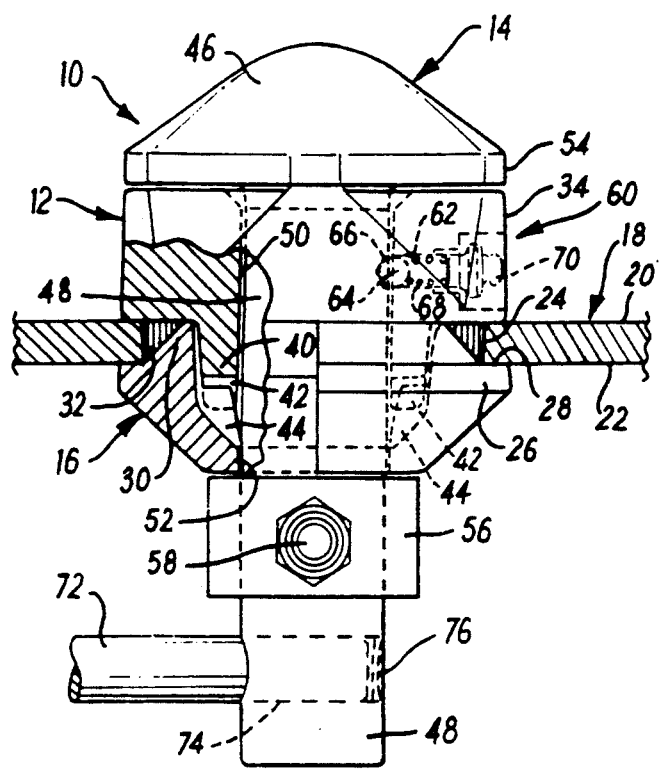
FIG. 1 is a part-sectional elevation of a first embodiment of twistlock in accordance with the present invention.
Figure 2:
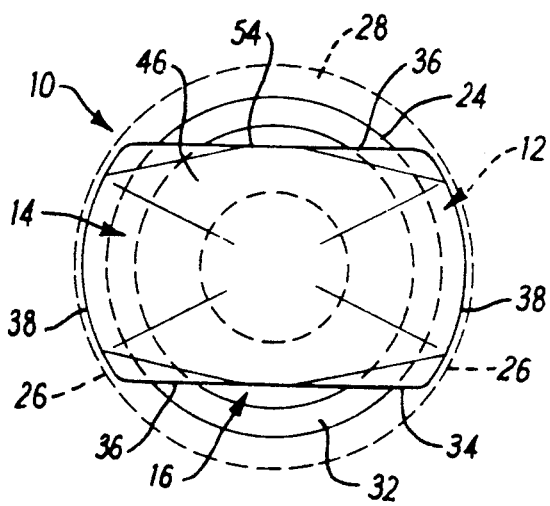
FIG. 2 is a plan view of the twist lock of FIG. 1.

Referring first to FIGS. 1 and 2, a first embodiment of twistlock 10 in accordance with the invention comprises a register 12, an anvil bolt 14, and a mounting boss 16.

The twistlock 10 is shown welded-in to an operational location in a planar container-supporting vehicle deck 18 having a topside 20 and an underside 22. A circular hole 24 is initially cut in the deck 18 for mounting of the twistlock 10, as will be detailed below.

The mounting boss 16 is a generally circular dished casting or forging having a peripheral flange 26 with a planar axial face 28 which abuts the deck underside 22 around the hole 24. A coaxial circular welding bevel 30 projects upwardly from the axial face 28, the bevel 30 lying within the periphery of the flange 26.

The mounting boss 16 is welded-in to the deck 18 by a circular fillet weld 32 filling the circular gap between the welding bevel 30 and the inner periphery of the deck hole 24. The twistlock 10 is initially dismantled and the mounting boss 16 is welded-in to the deck 18 as a separate component, thus obviating heat-induced distortion of the other components of the twistlock 10. Alignment of the mounting boss 16 for its welding-in to the deck 18 is accomplished in an axial direction by abutment of the axial face 28 with the planer deck underside 22, and rotationally by suitable rotational prealignment of the mounting boss 16 with respect to the eventual operational position of the register 12, as detailed below.

When the mounting boss 16 is welded-in to the deck 18, the register 12 is simply dropped in to the boss 16 to project upwardly from the deck topside 20. The register 12 has a periphery 34 which has a conventionally approximately rectangular outline in plan (see FIG. 2), and is slightly tapered vertically (see FIG. 1). The register periphery 34 comprises an opposed pair of relatively longer faces 36 mutually joined by a pair of relatively shorter and somewhat curved faces 38.

A rim 40 depending from the underside of the register 12 is formed with a diametrically opposed pair of slots 42 which register with a diametrically opposed pair of upstanding keys 44 formed in the interior of the mounting boss 16, such as to rotationally align the register periphery 34 with the sides of a slot in a conventional container mounting fitting (not shown) which the twistlock 10 is intended to register and latch in use of the twistlock 10.

The anvil bolt 14 has a conventionally T-shaped head 46 with a cylindrical stem 48 depending therefrom coaxially with the longitudinal axis of the bolt 14, which is coaxial with the twistlock 10 and normal to the topside 20 of the container-supporting deck 18 in which the twistlock 10 is mounted.

In the twistlock 10, the bolt stem 48 passes with minimal radial clearance through a central aperture 50 in the register 12, such that the bolt 14 can rotate about its longitudinal axis while being radially and axially upwardly supported by the register 12. The bolt stem 48 also passes coaxially down through a central aperture 52 having transverse dimensions which provide a clearance fit around the bolt stem 50 to avoid interfering with rotation of the anvil bolt 14 in the twistlock 10.

The bolt head 46 has a periphery 54 whose plan outline substantially matches the approximately rectangular plan outline of the periphery 34 of the register 12. The bolt 14 is rotatable about its longitudinal axis (the vertical central axis of the twistlock 10) between a first rotational position shown in FIGS. 1 and 2 wherein the bolt head 46 is aligned with the register 12 such that their respective peripheries 54 and 34 are mutually aligned, and a second rotational position (detailed below with reference to FIG. 3) in which the bolt head 46 is rotationally substantially misaligned with the register 12 for performance of a container-latching function.

In order to hold the assembled twistlock 10 together without preventing the proper operational rotation of the anvil bolt 14, a collar 56 is secured by a transverse fastener 58 on the lower end of the bolt stem 48. The collar 56 has transverse dimensions which are sufficiently greater that the transverse dimensions of the aperture 52 through the mounting boss 16 as to prevent upward passage of the collar 56, and hence of the bolt stem 48 secured thereto by the fastener 58, through the boss 16. The collar 56 is secured on the bolt stem 48 at a position immediately below the mounting boss 16 which provides the necessary axial restraint on the bolt 14, without inhibiting rotational movement of the bolt 14 about its longitudinal axis.

Downward axial movement of the anvil bolt 14 in the assembled twistlock 10 is restrained by the bolt head 46 resting on top of the register 12.

Downward axial movement of the register 12 is restrained by the register 12 resting on the deck topside 20, while upward axial movement of the register 12 is restrained by the bolt head 46, the bolt 14 as a whole being axially restrained as described above.

A detent mechanism 60 is provided in the twistlock 10 for rotationally latching the anvil bolt 14 in its first and second rotational positions (as detailed above). The detent mechanism 60 comprises a horizontal radial passage 62 formed in the register 12, and containing a radially movable ball 64 at the inner end of the passage 62. The ball 64 is urged radially inwards into one or other of two depressions 66 at angularly suitably spaced locations on the periphery of the bolt stem 48, inward radial bias of the ball 64 being accomplished by a coiled compression spring 68 housed in the passage 62 and retained therein by a passage cap 70 which is preferably formed as lubricant injection nipple.

The anvil bolt 14 can be rotated by any suitable means between its first and second rotational positions in the assembled twistlock 10. A preferred means for so rotating the bolt 14 comprises a radially extending elongate handle 72 secured in a transverse hole 74 in the bottom end of the bolt stem 48 by a weld 76 applied after assembly of the remainder of the twistlock 10, or secured by any other suitable means. The handle 72 enables the anvil bolt 14 to be manually rotated as required.

Figure 3:
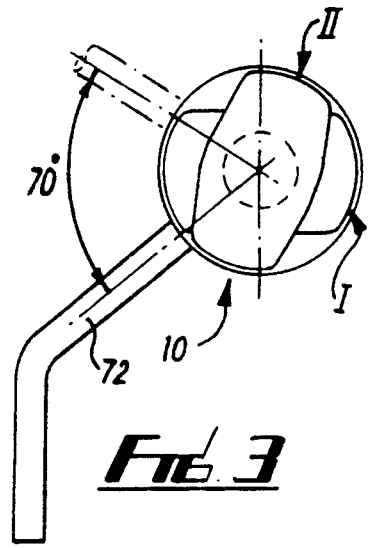
FIG. 3 is a schematic plan view, to a reduced scale, depicting operation of the twistlock of FIGS. 1 and 2.

FIG. 3 is a schematic plan view, to a reduced scale, of the twistlock 10 of FIGS. 1 and 2, showing (superimposed) the first and second rotational positions of the anvil bolt therein. In the first rotational position (denoted "I" in FIG. 3), the anvil bolt 14 is rotationally aligned with the register 12, ie the position shown in FIG. 2. In the second rotational position (denoted "II" in FIG. 3), the anvil bolt 14 is rotated anti-clockwise (as viewed from above) by seventy degrees from position I to bring the bolt head periphery 54 into substantial rotational misalignment with the register periphery 34. In position II, a conventional container fitting (not shown) fitted over the register 12 to be supported on the container supporting deck 18 will be laterally supported thereon by lateral engagement with the register 12, and axially retained on the deck 18 by the now-overlying wings of the bolt head 46 which extend over the register sides 36 in position II to perform a container-locking function.

Figure 4:
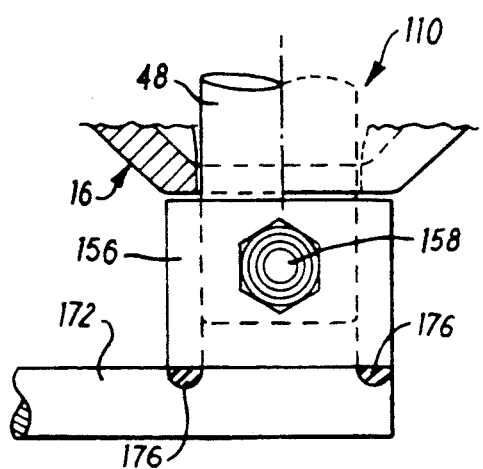
FIG. 4 is a part-sectional fragmentary elevation of a second embodiment of twistlock in accordance with the present invention.

FIG. 4 illustrates a part-sectioned fragmentary elevation of part of a second embodiment of twistlock 110 in accordance with the present invention. The twistlock 110 comprises a modification of the axial retention collar 56 and the handle 72 of the twistlock 10, the remainder (not illustrated) of the twistlock 110 being essentially identical to the equivalent parts of the twistlock 10 (which are given the same reference numerals in FIG. 4 and to the description of which reference should be made for a detailed description of those parts of the twistlock 110 not detailed below).

In the twistlock 110, axial retention of the anvil bolt stem 48 is performed by a collar 156 secured over the lower end of the bolt stem 48 by a transverse fastener 158. The collar 156 is located immediately below the mounting boss 16 to provide the anvil bolt 14 with axial restraint while allowing rotational movement thereof, as described above with reference to FIGS. 1 and 2.

A radially extending elongate handle 172 is secured to the collar 156 by welds 176 between the handle 172 and the lower end of the collar 156 (which depends below a somewhat shorter version of the bolt stem 48).

Operation of the twistlock 110 is identical to that of the twistlock 10.

Figure 5:
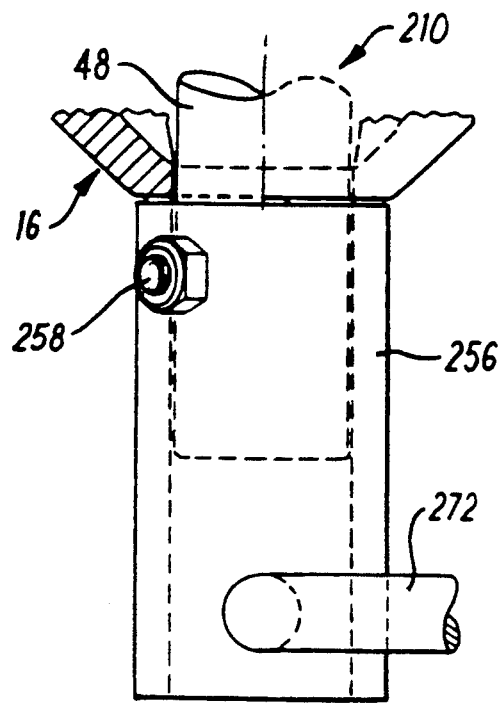

FIG. 5 illustrates a part-sectioned fragmentary elevation of part of a third embodiment of twistlock 210 in accordance with the present invention. The twistlock 210 comprises a modification of the axial retention collar 56 and the handle 72 of the twistlock 10, the remainder (not illustrated) of the twistlock 210 being essentially identical to the equivalent parts of the twistlock 10 (which are given the same reference numerals in FIG. 5 and to the description of which reference should be made for a detailed description of those parts of the twistlock 110 not detailed below).

In the twistlock 210, axial retention of the anvil bolt stem 48 is performed by a collar 256 secured over the lower end of the bolt stem 48 by a transverse fastener 258. The collar 256 is located immediately below the mounting boss 16 to provide the anvil bolt 14 with axial restraint while allowing rotational movement thereof, as described above with reference to FIGS. 1 and 2.

A radially extending L-shaped elongate handle 272 is secured to the collar 256.

Operation of the twistlock 210 is identical to that of the twistlock 10.

Figure 6:
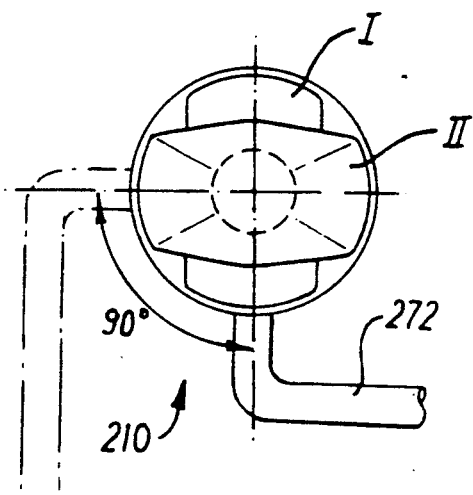

FIG. 6 is a schematic plan view, to a reduced scale, of the twistlock 210 of FIG. 5, showing (superimposed) the first and second rotational positions of the anvil bolt therein. In the first rotational position (denoted "I" in FIG. 6), the anvil bolt is rotationally aligned with the register. In the second rotational position (denoted "II" in FIG. 6), the anvil bolt is rotated anti-clockwise (as viewed from above) by ninety degrees from position I to bring the bolt head periphery into substantial rotational misalignment with the register periphery. In position II, a conventional container fitting (not shown) fitted over the register to be supported on the container supporting deck will be laterally supported thereon by lateral engagement with the register, and axially retained on the deck by the now-overlying wings of the bolt head which extend over the register sides in position II to perform a container-locking function.

While only a single twistlock has been described above in detail, twistlocks are customarily employed in groups, for example groups of four with one for each bottom corner of a freight container; therefore use of the twistlock in accordance with the invention should be deemed to be in an appropriate plurality thereof if use of a solitary twistlock is inadequate or undesirable.

Furthermore, while it has been assumed that the twistlock in accordance with the invention is utilised in the upright attitude shown in the accompanying drawings, the twistlock can be operated in other inclinations as desired and descriptive words relating to attitudes and relative heights are to be construed accordingly.

Notwithstanding that certain modifications and variations have been described above, the invention is not restricted thereto, and other modifications and variations can be adopted without departing from the scope of the invention as defined in the appended claims.

I claim:

1. A twistlock which can be welded-in to an operational position thereof in a container-supporting deck of a vehicle, said twistlock comprising:

a register having a periphery which is approximately rectangular in plan and which is bounded in plan by an opposed pair of relatively longer sides joined by an opposed pair of relatively shorter sides, said register having a substantially central through-bore having an axis which is substantially normal to the plan of said register, an anvil bolt having a T-shaped head and a substantially cylindrical stem depending therefrom about a longitudinal axis of said bolt, said T-shaped head of said anvil bolt having a periphery whose outline in plan substantially matches said periphery of said register, said through-bore of said register and said substantially cylindrical stem of said anvil bolt being dimensionally related such as to allow said anvil bolt to rotate in said through-bore of said register, about said longitudinal axis of said bolt, said twistlock further comprising a mounting boss having a deck-underside-abutting peripheral flange thereon, said peripheral flange having a deck-underside-abutting axial face for abutting the underside of a container-supporting deck of a vehicle upon which said twistlock is installed in use thereof, said mounting boss having a substantially circular welding bevel thereon substantially contiguous with said deck-underside-abutting axial face of said peripheral flange of said mounting boss, said substantially circular welding bevel being located substantially entirely within the periphery of said peripheral flange of said mounting boss, said mounting boss having an aperture therethrough, said aperture in said mounting boss being substantially coaxial with said substantially circular welding bevel, said aperture in said mounting boss having transverse dimensions at least marginally greater than the transverse dimensions of said substantially cylindrical stem of said anvil bolt to permit said stem to rotate within said aperture substantially without mutual interference therebetween, and said twistlock additionally comprising retention means for retaining said register and said anvil bolt in operational positions in said twistlock upon assembly thereof.

2. A twistlock as claimed in claim 1, wherein said retention means comprises rotational constraint means to rotationally constrain said register substantially in a predetermined rotational position on a topside of a container-supporting deck of a vehicle upon assembly of said twistlock thereon, and axial restraint means mountable adjacent a lower end of said stem of said anvil bolt to axially restrain said anvil bolt in said twistlock while permitting rotational freedom of said anvil bolt at least in a range of rotational movement of said anvil bolt about said longitudinal axis thereof between a first rotational position of said anvil bolt in which said T-shaped head of said anvil bolt has said periphery thereof substantially aligned with said periphery of said register, and a second rotational position of said anvil bolt in which said T-shaped head of said anvil bolt has the periphery thereof substantially misaligned with said periphery of said register for performance of a container-latching function in use of said twistlock after assembly thereof on a container-supporting deck of a vehicle.

3. A twistlock as claimed in claim 2, wherein said rotational constraint means of said retention means comprises mutually cooperable key and slot means on portions of said register and of said mounting boss which are mutually adjacent in said twistlock when assembled on a container-supporting deck of a vehicle, said key and slot means mutually cooperating in a so-assembled twistlock to provide said rotational constraint of said register.

4. A twistlock as claimed in claim 2, wherein said axial restraint means of said retention means comprises a collar means securable on said stem of said anvil bolt at a position thereon immediately adjacent said mounting boss in said twistlock when assembled on a container-supporting deck of a vehicle, said collar means having transverse dimensions greater than said transverse dimensions of said aperture through said mounting boss to prevent passage of said collar means through said aperture in a so-assembled twistlock to provide said axial restraint of said anvil bolt.

5. A twistlock as claimed in claim 1, wherein said twistlock incorporates rotational detent means in an assembled configuration thereof, said rotational detent means being located between said register and said anvil bolt to be mutually effective thereon to rotationally detain said anvil bolt in each of first and second rotational positions thereof when said anvil bolt is rotated to the respective one of said first and second positions.

6. A twistlock as claimed in claim 1, wherein said twistlock further comprises handle means by which said anvil bolt may be manually rotated at least between first and second positions thereof.

7. A twistlock as claimed in claim 6, wherein said handle means is secured to the lower end of said stem of said anvil bolt.

8. A twistlock as claimed in claim 6, wherein said handle means is secured to a collar means mounted on said stem of said anvil bolt.

9. A twistlock welded-in to a substantially circular hole through a container-supporting deck of a vehicle, said deck having a topside and an underside, said twistlock comprising:

a mounting boss having a deck-underside-abutting peripheral flange thereon, said peripheral flange having a deck-underside-abutting axial face abutting portions of said underside of said container-supporting deck surrounding said substantially circular hole therethrough, said mounting boss having a substantially circular welding bevel thereon substantially contiguous with said deck-underside-abutting axial face of said peripheral flange of said mounting boss, said substantially circular welding bevel being located substantially entirely within the periphery of said peripheral flange of said mounting boss, said substantially circular welding bevel being located within and welded-in to said substantially circular hole through said container-supporting deck, said mounting boss having an aperture therethrough substantially coaxial with said substantially circular welding bevel, said twistlock further comprising a register having a periphery which is approximately rectangular in plan and which is bounded in plan by an opposed pair of relatively longer sides joined by an opposed pair of relatively shorter sides, said register being mounted on said welded-in mounting boss to have said approximately rectangular periphery thereof upstanding from said topside of said container-supporting deck, said twistlock additionally comprising retention means including rotational constraint means mutually effective between said mounting boss and said register to rotationally constrain said register substantially in a predetermined rotational position on said topside of said container-supporting deck, said twistlock further comprising an anvil bolt having a T-shaped head and a substantially cylindrical stem depending therefrom about a longitudinal axis of said bolt, said register having a substantially central through-bore having an axis which is substantially normal to said topside of said container-supporting deck, said anvil bolt being mounted on said register with said substantially cylindrical stem of said anvil bolt depending substantially coaxially through said through bore of said register and depending substantially coaxially through said aperture in said mounting boss for rotation of said anvil bolt about said longitudinal axis thereof with said longitudinal axis thereof aligned substantially normal to said topside of said container-supporting deck, said through-bore of said register and said substantially cylindrical stem of said anvil bolt being dimensionally related such as to allow such rotation of said anvil bolt about said longitudinal axis thereof, said aperture in said mounting boss having transverse dimensions at least marginally greater that the transverse dimensions of said substantially cylindrical stem of said anvil bolt to permit said stem to rotate within said aperture substantially without mutual interference therebetween, said T-shaped head of said anvil bolt having a periphery whose outline in plan substantially matches said periphery of said register, said anvil bolt being rotatable at least in a range of rotational movements about said longitudinal axis thereof between a first rotational position of said anvil bolt in which said T-shaped head of said anvil bolt has said periphery thereof substantially aligned with said periphery of said register, and a second rotational position of said anvil bolt in which said T-shaped head of said anvil bolt has the periphery thereof substantially misaligned with said periphery of said register for performance of a container-latching function of said twistlock, said retention means of said twistlock additionally comprising axial restraint means mounted adjacent a lower end of said stem of said anvil bolt to axially restrain said anvil bolt in said twistlock while permitting rotational freedom of said anvil bolt in a range of rotational movement of said anvil bolt about said longitudinal axis thereof at least between said first and second rotational positions of said anvil bolt.

10. A twistlock as claimed in claim 9, wherein said rotational constraint means of said retention means comprises mutually cooperating key and slot means on mutually adjacent portions of said register and of said mounting boss, said mutually cooperating key and slot means cooperating in said twistlock to provide said rotational constraint of said register.

11. A twistlock as claimed in claim 9, wherein said axial restraint means of said retention means comprises a collar means secured on said stem of said anvil bolt at a position thereon immediately below the portion of said stem depending through said aperture in said mounting boss, said collar means having transverse dimensions greater than said transverse dimensions of said aperture to prevent passage of said collar means and hence of said stem through said mounting boss.

12. A twistlock as claimed in claim 9, wherein said twistlock further comprises rotational detent means located between said register and said anvil bolt to be mutually effective thereon to rotationally detain said anvil bolt in either one of said first and second rotational positions thereof.

13. A twistlock as claimed in claim 9, wherein said twistlock further comprises handle means by which said anvil bolt can be manually rotated at least between said first and second rotational positions thereof.

14. A twistlock as claimed in claim 13, wherein said handle means is secured to the lower end of said stem of said anvil bolt.

15. A twistlock as claimed in claim 13, wherein said handle means is secured to a collar means mounted on the lower end of said stem of said anvil bolt.

* * * * *